(12) United States Patent
Snyder

(10) Patent No.: US 6,752,071 B1
(45) Date of Patent: Jun. 22, 2004

(54) THICK FILM HEATER FOR A POPCORN POPPER

(75) Inventor: Steven A. Snyder, Loveland, OH (US)

(73) Assignee: Gold Medal Products Company, Cincinnatti, OH (US)

(*) Notice: Subject to any disclaimer, the term of this patent is extended or adjusted under 35 U.S.C. 154(b) by 0 days.

(21) Appl. No.: 10/077,329

(22) Filed: Feb. 15, 2002

(51) Int. Cl.[7] ............................................. A23L 1/18
(52) U.S. Cl. ................................. 99/323.5; 99/323.9
(58) Field of Search ............................ 99/323.4, 323.5, 99/323.6, 323.7, 323.8, 323.9, 323.11; 219/386, 385, 387, 218, 400, 390, 395, 411, 405, 416, 441, 446.1, 447.7, 449.1, 466.1, 468.1; 426/438, 520, 523

(56) References Cited

U.S. PATENT DOCUMENTS

| | | | | |
|---|---|---|---|---|
| 1,489,342 A | | 4/1924 | Brent | 425/9 |
| 3,036,532 A | | 5/1962 | Bowe | 107/8 |
| 3,067,315 A | | 12/1962 | Hurko | 219/37 |
| 3,070,045 A | | 12/1962 | Bowe | 107/8 |
| 3,073,262 A | | 1/1963 | Bowe | 107/8 |
| 3,483,281 A | | 12/1969 | Chisholm | 264/25 |
| 4,032,750 A | * | 6/1977 | Hurko | 219/464 |
| 4,526,525 A | | 7/1985 | Oiso et al. | 425/9 |
| 4,793,782 A | | 12/1988 | Sullivan | 425/7 |
| 4,872,821 A | | 10/1989 | Weiss | 425/9 |
| 4,967,061 A | * | 10/1990 | Weber, Jr. et al. | 219/438 |
| 5,066,430 A | | 11/1991 | Matthews | 264/8 |
| 5,145,687 A | | 9/1992 | Parker | 425/9 |
| 5,177,341 A | | 1/1993 | Balderson | 219/543 |
| 5,441,754 A | | 8/1995 | Evans, Sr. | 426/483 |
| 5,445,769 A | | 8/1995 | Rutkowski et al. | 264/8 |
| 5,460,498 A | | 10/1995 | Steel et al. | 425/8 |
| D365,981 S | | 1/1996 | Sullivan | D9/337 |
| 5,498,144 A | | 3/1996 | Francis et al. | 425/9 |
| 5,766,643 A | | 6/1998 | Hammon | 425/9 |
| 5,928,550 A | | 7/1999 | Weiss | 219/620 |
| 6,092,458 A | | 7/2000 | Weiss et al. | 99/323.7 |
| 6,153,859 A | * | 11/2000 | Taylor et al. | 219/441 |
| 6,164,192 A | * | 12/2000 | Stein et al. | 99/323.8 |

OTHER PUBLICATIONS

Watlow Industries, *Thick Film Heaters on Stainless Steel Offer Low Profile and High Performance*, Brochure (1 page), date unknown.

* cited by examiner

Primary Examiner—Reginald L. Alexander
(74) Attorney, Agent, or Firm—Wood, Herron & Evans LLP

(57) ABSTRACT

A kettle for popping corn has a thick film heater applied to a bottom wall of the kettle. The thick film heater may be used to uniformly heat the kettle or provide a controlled temperature gradient across the kettle cooking surface. The kettle and thick film heater provide efficient heating of the kettle and better control of heat supplied to the cooking surface.

27 Claims, 3 Drawing Sheets

THICK FILM HEATER FOR A POPCORN POPPER

FIELD OF THE INVENTION

The present invention relates generally to machines for popping popcorn, and more particularly to an improved kettle for popping popcorn.

BACKGROUND OF THE INVENTION

To obtain the highest quality popped corn, that is, popcorn having a large size and a fluffy texture as a result of having a high expansion ratio, it is imperative to closely control the cooking time of the popcorn. If the cooking time is too fast or too slow, the resulting popcorn will be small and chewy, and there will be too many unpopped kernels. To effectively control the cooking time of popcorn popped in a kettle, the heat energy input into the kettle must be closely controlled.

Present electric popcorn popping machines utilize tubular or ring type heating elements made from nickle-chromium wire and having a magnesium oxide outer layer for insulation. These heating elements are clamped to the bottom of popcorn popping kettles to transfer heat by conduction to the cooking surface of the kettle. Large size kettles may have as many as two or three individual heating elements. These current popcorn popping machines suffer many drawbacks, such as exhibiting hot and cold spots on the cooking surface of the kettle, where areas near the heating elements are hotter than areas which are further away from the heating elements. Variations in the thermal profile of the cooking surface are also partly related to the conductivity of the kettle material. From a maintenance standpoint, the most desirable kettle material is stainless steel, which provides a durable cooking surface that is easily cleaned. However, stainless steel has a lower thermal conductivity value than low carbon steel or aluminum, and therefore produces very uneven surface temperatures when heated by conventional tubular or ring-type heating elements.

Another drawback of conventional popcorn popping machines is that a significant amount of heat energy is lost below the heating elements by radiation and convection. This loss of heat energy translates to an inefficient cooking process. Current popcorn popping machines also exhibit a significant response time lag between the instant power is supplied or discontinued to the heating element and the actual heat transfer from the element to the popcorn popping kettle. This time lag is due to the mass and construction of the tubular or ring type heating elements and is particularly troublesome when power is shut off to the heating element, but the kettle continues to receive heat energy from the heating elements.

For at least these reasons, a need exists for an improved popcorn popping kettle which can provide a uniform heating of a cooking surface, and in particular, a stainless steel cooking surface, without exhibiting hot or cold spots, and which has a reduced response time, compared to current popcorn popping machines, to provide efficient and controlled cooking of popcorn.

SUMMARY OF THE INVENTION

The present invention provides an improved popcorn popping kettle having a heater which provides for uniform heating of the entire kettle cooking surface to ensure controlled cooking of the popcorn. The kettle heater is a thick film heater which can generate heat when supplied with electric current. As referred to herein, the term "film" and "film heater" are directed to heating elements or resistive conductors which are relatively thin with respect to their possible length and width dimensions. Such films may be printed, plated, or otherwise deposited on the surface to be heated. Therefore, such heated films are generally considered to be two-dimensional heaters, although they do have a certain finite thickness, as will be understood by persons skilled in the art. Film heaters suitable for an embodiment of the invention might be referred to as "thick film heaters" because the films are relatively thicker than thinner films used in other industries and applications, such as the semiconductor industry. However, relative to existing heating elements and heaters for prior art popcorn popping machines, the films and heaters of the present invention are significantly thinner than the heating elements used and taught by that art.

The film of the present invention may be applied directly to the kettle cooking surface or it may be applied to a substrate which is thermally coupled to the kettle. An insulating material may be applied between film and substrate to provide electrical separation of kettle and film. The film heater may be constructed to provide a substantially uniform temperature across the cooking surface or it may be designed to provide a controlled temperature gradient, as may be desired in some applications.

In another aspect of the invention, a popcorn popping machine is constructed with a kettle including a film heater coupled to the kettle according to the principals of the present invention. In accordance with yet another aspect of the present invention, a method for cooking popcorn in a popcorn popping machine includes the steps of introducing popcorn into a kettle constructed with a film heater and controlling the heat energy of the kettle to correspond to the optimum cooking time of the popcorn.

Accordingly, the present invention provides a thick film heater for a popcorn popper, which overcomes the drawbacks of prior art popcorn poppers which utilized conventional tubular or ring type heating elements. For example, the thick film heater of the present invention provides for uniform heating of the cooking surface of a popcorn popping kettle and delivers heat to the kettle in a more efficient manner than was possible with conventional heating elements. Furthermore the thick film heater of the present invention exhibits a reduced response time with respect to power supplied to the heater, to provide better control of the heat energy delivered to the kettle. These and other objects and advantages of the present invention shall be made apparent from the accompanying drawings and description.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
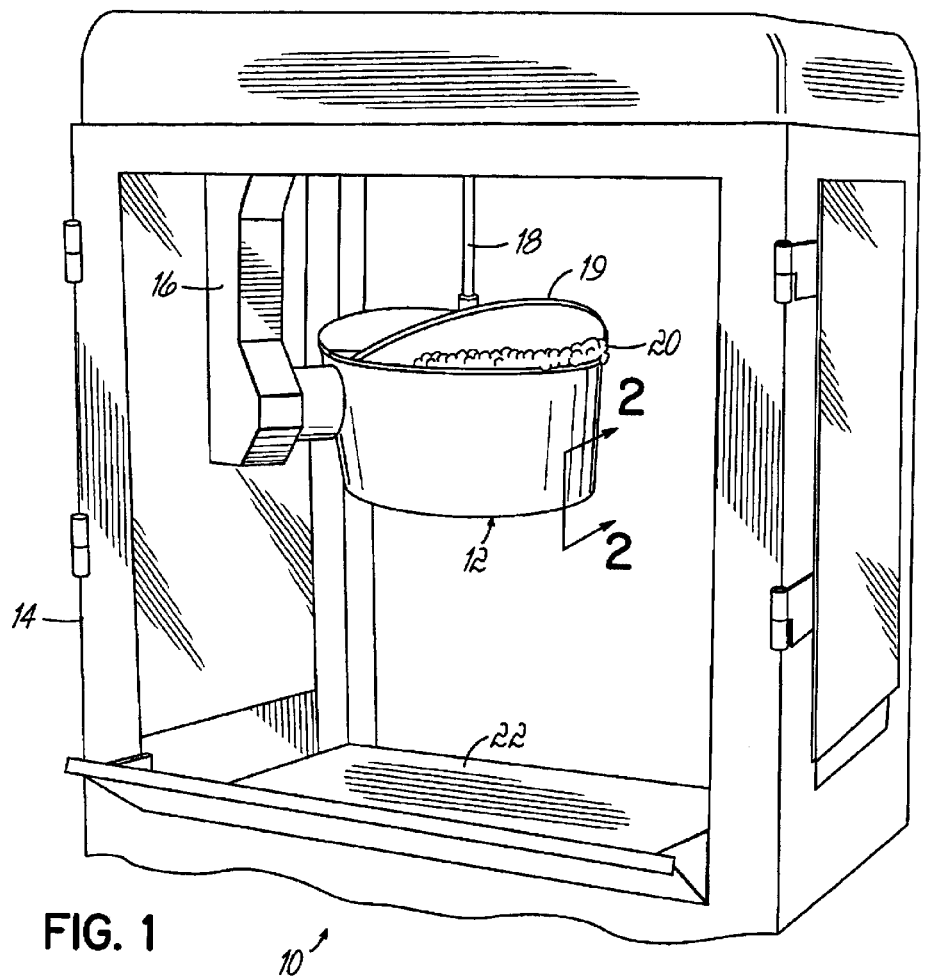
FIG. 1 is a perspective view of a popcorn popping machine, including a popcorn popping kettle incorporating the principles of the present invention.

FIG. 1 depicts a popcorn popping machine 10 including a popcorn popping kettle 12 according to the principles of the present invention. Popcorn popping kettle 12 is supported within a housing 14 and is pivotally attached to a support 16 connected to the housing 14. The popcorn popping machine 10 includes a mechanism 18 for stirring the kernels in the kettle 12 and opening a cover 19 to permit popcorn 20 to fall from the kettle 12 to a serving tray 22.

Figures 2A, 2B:
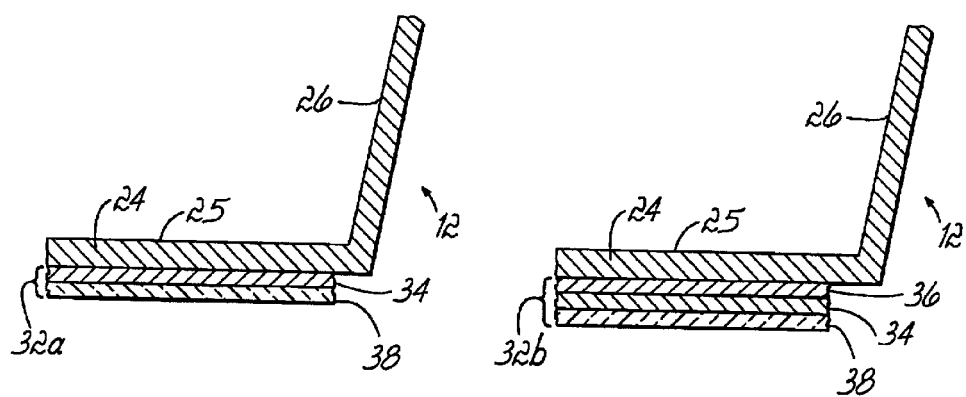
FIG. 2A is a partial cross-section of the popcorn popping kettle of FIG. 1, taken along line 2—2 and depicting an exemplary thick film heater according to the principles of the present invention.
FIG. 2B is a partial cross-section of an alternate exemplary embodiment of the thick film heater of FIG. 2A.

Referring to FIG. 2A, kettle 12 has a bottom wall 24 and a side wall 26. An interior side of the bottom wall 24 serves as the cooking surface 25 for the kettle 12. A composite thick film heater 32a (FIG. 2A), according to the principles of the present invention, is positioned on the bottom wall 24 of kettle 12, opposite the cooking surface 25. The thick film heater 32a includes a heater film 34 which is directly positioned on the kettle 12. The film may be printed, deposited, plated or otherwise positioned on the bottom wall 24. An insulating film 38 is applied thereover to form heater 32a.

Alternatively, the film 34 may be applied to an intermediate substrate 36, such as aluminum or stainless steel, which is then applied to the bottom wall 24, as depicted in FIG. 2B. When the film 34 is applied to an intermediate substrate 36, the film 34 heats the substrate 36 and the substrate 36 transfers the heat to the bottom wall 24. In such an embodiment, the film heater 32b comprises not only the film 34, but also the intermediate substrate 36.

Figure 2C:
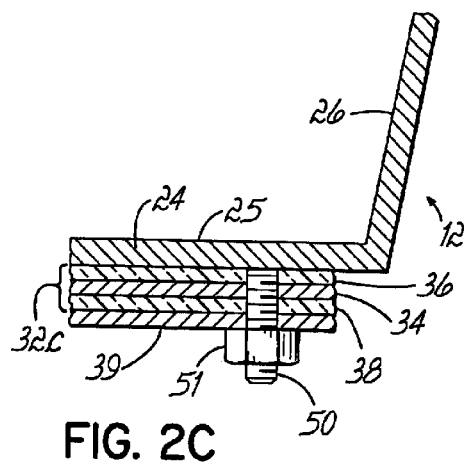
FIG. 2C is a partial cross-section of an alternative embodiment of FIGS. 2A and 2B and illustrating attachment of the heater sandwich to a kettle.

In a further embodiment, FIG. 2C, another layer of material, such as preferably stainless steel 39, or aluminum or any other suitable material is placed over insulation 38 (FIGS. 2B, 2C). This heater composite 32c includes a first substrate 36, heater film 34, insulation 38 and stainless steel layer 39. Stainless steel layer 39 helps in spreading the clamping load over the surfaces and facilitates operational contact of the heater 32C on the kettle surface.

The heaters 32a, 32b and 32c are thus composites of layers as described above. They are applied and secured to a kettle 12 by any suitable means. One form of such attachment is shown in FIG. 2C, wherein threaded stud 50 extends from the bottom of kettle 12. The heater elements in heaters 32a, 32b and 32c are provided with holes to accept a plurality of threaded studs 50. Once the heaters 32a or 32b are applied, nuts, such as nut 51, are applied to the studs and clamp the respective heaters to the respective kettles.

Referring to the film heaters 32a and 32b of FIGS. 2A, 2B, and 2C, insulative layer 38 is disposed on an outer side of the film 34, and comprises a dielectric material. This facilitates the compression of the film toward the kettle. For illustrative purposes, the thick film heater 32 of the present invention is depicted much larger than actual scale, however, prior art heating elements are generally much larger than the thick film heater of the present invention.

The film material 34 will generally be an electrically resistive, heatable material, of any suitable type, which heats up when power is supplied to the film 34. One such suitable material may be a resistive ink that can be printed directly onto the surface of the kettle 12 or an intermediate substrate 36, as described above. The film material might also be sprayed, plated or otherwise deposited on a desired surface, such as by chemical vapor deposition or physical vapor deposition.

Figure 3:
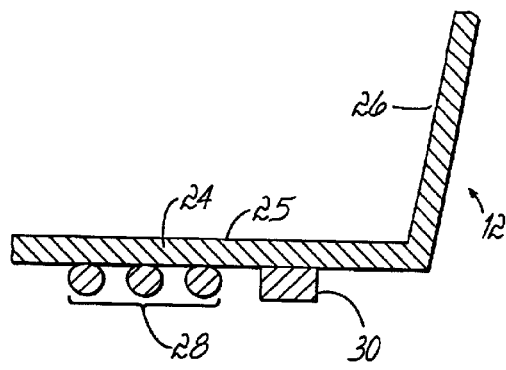
FIG. 3 is a cross-sectional view of a prior art popcorn popping kettle illustrating prior tubular or ring-type heating elements typical of conventional kettles.

In contrast to the invention, typical tubular heating elements 28 and ring-type heating elements 30 of a prior art kettle are illustrated in FIG. 3. As shown in FIG. 3, the tubular and ring-type heating elements are generally attached to the kettle in such a manner as to leave significant surface area of the kettle without direct contact with the heating elements. Use of the thick film heaters as described herein result in significantly improved even heat transfer.

Figure 4:
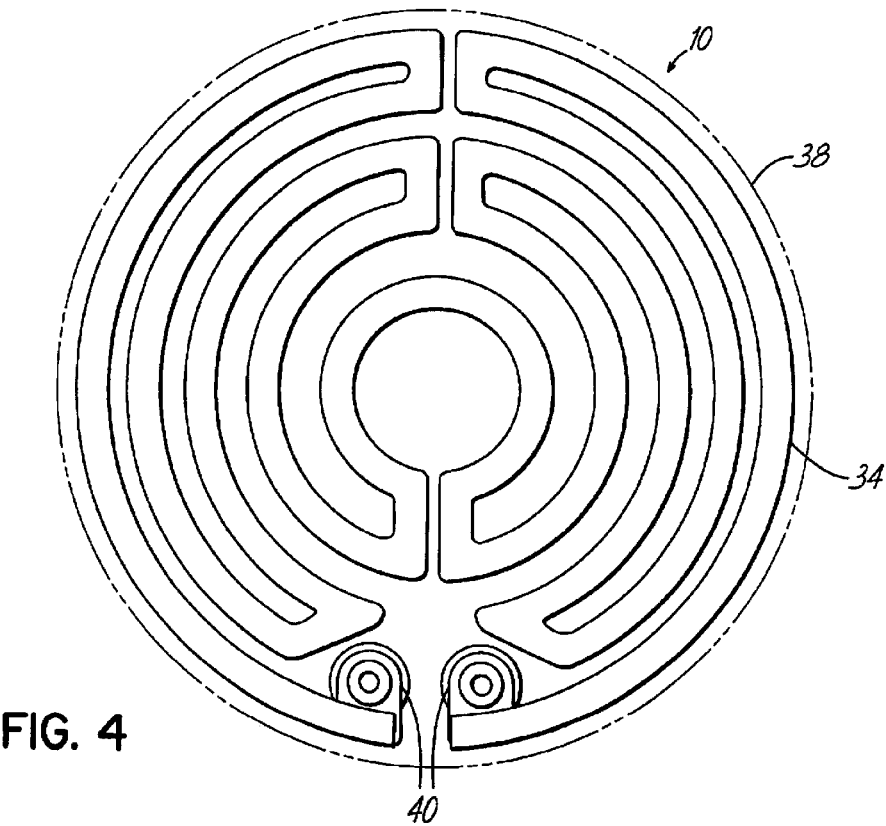
FIG. 4 is a plan view of an exemplary embodiment of a thick film heating element for use with a popcorn popping kettle according to the invention.

Referring to FIG. 4, an exemplary embodiment of a thick film heater 32a according to the principles of the present invention is shown. In the embodiment shown, the thick film heater 32a includes a resistive film 34, sandwiched between an insulative layer 38 (shown in phantom) and kettle 12 and arranged in a pattern which covers a desired portion of a popcorn kettle 12. The thick film heater 32a further includes electrical connectors 40 for attaching the film 34 to a power supply. The thick film heater 32a provides several advantages over prior art heaters. For example, the film 34 may be configured to comprise a wide variety of patterns and shapes and thereby cover a substantial portion of the bottom wall 24 of kettle 12. Thus, a large percentage of the cooking surface 25 may be directly heated by the thick film heater 32a of the present invention. As another example, the thick film heater 32a exhibits a shorter response time than conventional tube or ring type heater elements, due to its significantly lower mass. Thick film heaters 32a thus provide more robust control of thermal energy input to the kettle 12. The same applies, of course, to heaters 32b and 32c (jointly with 32a referred to as heaters 32).

The thick film heaters 32 may also be designed to improve the thermal characteristics of a kettle 12, wherein the film 34 may be configured to prevent hot and cold spots exhibited by the kettle cooking surface 25. In this regard, infrared scanning techniques may be used to determine optimum design of the film 34 to provide a desired thermal profile. The thick film heaters 32 could be used to provide uniform heating of the cooking surface 25, or alternatively, the film 34 may be configured to produce a specific and controlled heat gradient along the cooking surface 25. For example, the thick film heaters 32 may be designed to provide more heat near the sidewall 26 of the kettle 12. Such a design advantageously provides a greater amount of heat at the outer perimeter of the cooking surface 25 to account for the heat conducted up sidewalls 26 of the kettle 12.

Another advantage of the thick film heaters 32 of the present invention is that they may be used to uniformly heat the bottom of the kettle with less power than is required with conventional tubular or ring-type heating elements. This is due to the ability of the thick film heaters 32 to be configured to cover substantially the entire bottom wall 24. The power savings may be up to about 20%, compared to conventional heating elements.

Additional energy savings are provided by the thick film heaters 32 due to an inherent characteristic of the film 34 to exhibit increased resistance at higher temperatures. This increased resistance translates to lower power consumption while maintaining the kettle 12 at a given temperature. At full temperature, the increased resistance may result in power savings of up to about 20%, compared to conventional ring-type or tubular-type heating elements. The increased resistance characteristic of the film 34 may also be incorporated into the operation of the popcorn popper 10, whereby a standby mode of operation may take advantage of the lower power requirements, during a period when the kettle 12 is not being used to pop corn, to maintain the kettle 12 at a given temperature.

Figure 5:
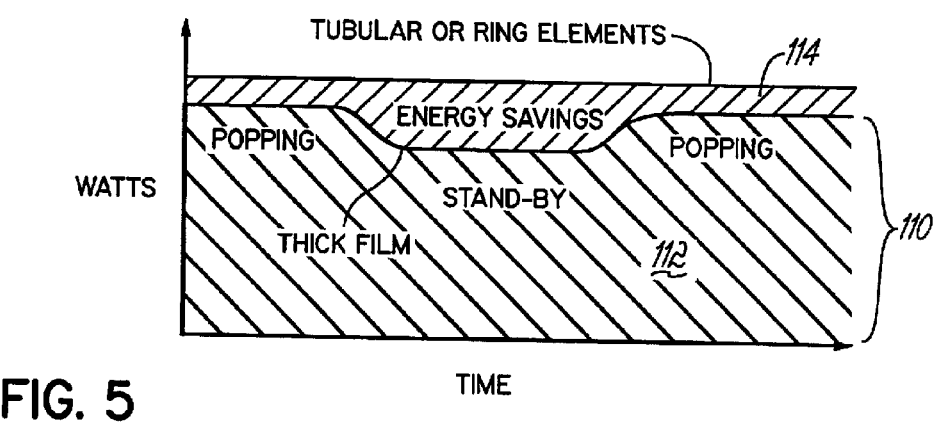
FIG. 5 is a graph illustrating typical power versus time plots for a popcorn popping kettle having tubular or ring-type elements and a popcorn popper having a thick film heater, and further illustrating energy saved by the present invention.

FIG. 5 illustrates the difference in power consumption for tubular or ring-type elements of conventional systems compared to the thick film heaters 32 of the present invention. The figure illustrates not only the savings that is possible due to the lower power required to heat the kettle during popping, but also the energy savings possible by utilizing a standby mode of operation which takes advantage of the increased resistance of the film 34 high temperatures. The areas 110, 112 beneath the plots of power versus time for conventional tubular or ring type elements 28, 30 and for thick film heaters 32, respectively, represent the energy required by the respective systems to maintain the kettle 12 at a desired temperature. The difference between these two areas, depicted as area 114, represents the energy savings that can be achieved by a kettle 12 utilizing thick film heaters 32 of the present invention.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of Applicant's general inventive concept.

What is claimed is:

1. An apparatus for popping corn, comprising;

a support;

a kettle for receiving and holding corn kernels, said kettle pivotally coupled to said support and having a bottom wall and at least one side wall; and a film heater operatively coupled to said kettle and including a film which is operable to heat said kettle when an electrical current is delivered to said film.

2. The apparatus of claim 1 wherein said film is directly applied onto said bottom wall to form the film heater.

3. The apparatus of claim 1 wherein said film heater comprises a film applied to a substrate, said film operable to heat said substrate, and said film and substrate being thermally coupled to said bottom wall for heating said bottom wall.

4. The apparatus of claim 3 further comprising an electrically insulative material positioned on another side of said film from said substrate.

5. The apparatus of claim 1 wherein said film has at least one outer side, the apparatus further comprising an insulative material positioned on at least said outer side of the film opposite said kettle bottom wall.

6. The apparatus of claim 1 wherein said film is coextensive with a significant portion of said bottom wall.

7. The apparatus of claim 1 wherein said film is formed in a pattern which provides substantially uniform distribution of heat to said bottom wall.

8. The apparatus of claim 1 wherein said film is formed in a pattern which provides a heat gradient which varies with distance away from said side wall.

9. The apparatus of claim 8 wherein said film is formed in a pattern to provide an increased heat load proximate said side wall.

10. The apparatus of claim 3 wherein said substrate includes one of aluminum and stainless steel.

11. The apparatus of claim 1 wherein said bottom wall includes an inner surface and an outer surface, said film heater being applied against said outer surface of said bottom wall.

12. The apparatus of claim 2 wherein said film is deposited onto said bottom wall.

13. The apparatus of claim 2 wherein said film is printed onto said bottom wall.

14. The apparatus of claim 13 wherein said film includes a resistive ink.

15. The apparatus of claim 1 further including a first substrate layer disposed between said bottom wall and said film.

16. The apparatus of claim 15 further including an insulative substrate disposed on another side of said film from said first substrate.

17. The apparatus of claim 16 further including a second substrate disposed on a side of said insulative substrate opposite said film heater.

18. A popcorn popper, comprising:

a cabinet having an interior;

a kettle supported within said interior of said cabinet, said kettle having a bottom wall and at least one side wall; and a film heater operatively coupled to said kettle and including a film which is operable to heat said kettle when electrical current is delivered to the film.

19. The popcorn popper of claim 18 wherein said film is directly applied onto said bottom wall to form the film heater.

20. The popcorn popper of claim 18 wherein said film heater comprises a film applied to a substrate, said film operable to heat said substrate, and said film and substrate being thermally coupled to said bottom wall for heating the bottom wall.

21. The popcorn popper of claim 20 further comprising an insulative material positioned on another side of said film from said substrate.

22. The popcorn popper of claim 21 further including a second substrate disposed on an outer surface of said insulative material.

23. The popcorn popper of claim 18 wherein said film is formed in a pattern to provide an increased heat load proximate said side wall.

24. A method for popping corn in a popcorn popper having a kettle and a film heater operatively coupled to the kettle, the method including the steps of:

introducing corn kernels into the kettle; and supplying electrical current to the film heater to heat the kettle.

25. The method of claim 24, further comprising:

uniformly heating a bottom surface of the kettle with the film heater; and popping the corn kernels through the uniform application of heat.

26. An apparatus for popping corn, comprising:

a support;

a kettle for receiving and holding corn kernels, said kettle pivotally coupled to said support and having a bottom wall and at least one side wall; and a film heater operatively coupled to said kettle and including a film which is operable to heat said kettle when an electrical current is delivered to said film;

wherein said film is formed in a pattern which provides substantially uniform distribution of heat to said bottom wall.

27. An apparatus for popping corn, comprising:

a support;

a kettle for receiving and holding corn kernels, said kettle pivotally coupled to said support and having a bottom wall and at least one side wall; and a film heater operatively coupled to said kettle and including a film which is operable to heat said kettle when an electrical current is delivered to said film;

wherein said film is formed in a pattern which provides a heat gradient which varies with distance away from said side wall.

* * * * *